Patented Oct. 25, 1938

2,134,494

UNITED STATES PATENT OFFICE 2,134,494

FACE PAINT BASE

Helene Winterstein, née Vierthaler, Vienna, Austria

No Drawing. Application March 9, 1935, Serial No. 10,277. In Austria March 16, 1934

3 Claims. (Cl. 167—85)

This invention relates to face paint bases. There are cosmetic face paints known which consist of emulsions of waxes with aqueous liquids with the addition of fatty oils, neutral or weakly alkaline emulsifying agents being employed. These face paints suffer however from the drawback that they do not adhere firmly, since the fatty oils used dry but very slowly and therefore give rise to smudging.

The essence of the invention consists in adding a volatile solvent for the waxes, for example oil of turpentine, to the emulsion of waxes with aqueous liquids before or after the emulsification. A face paint thus obtained adheres perfectly, since the oil of turpentine evaporates after application. The paint is insoluble in water and yet readily admits of removal with the aid of soap, since the waxes have already been brought into a suitable state for this purpose by the process of emulsification.

The face paint according to the invention is more particularly suitable for use in making up the eyebrows and eyelashes. It is applied in a pasty state to the eyelashes or brows to which it firmly adheres, after the evaporation of the oil of turpentine, coating each hair with a fine film.

The emulsion is prepared in a manner known per se with the employment of neutral or weakly alkalined emulsifying agents, the wax being heated to melting point and coloring matter dissolved in the melt. Water is then dispersed in this wax in such quantity that a soft unguent emulsion is obtained, and the volatile oil, for example oil of turpentine, is added under constant stirring until the mass has become cold, whereupon the creamy emulsion thus obtained can be perfumed with volatile oils in a manner known per se. It is however also possible to proceed by first admixing the oil of turpentine or the like to the molten wax and then effecting the emulsification with water. The face paint thus produced can then be packed in collapsible tubes, in order to prevent drying up.

For the production of the face paint according to the invention there may be taken for example 5 parts of wax (beeswax, ceresin, Japan vegetable wax, or the like), 1 to 16 parts of oil of turpentine, and as much water as is necessary for the formation of the required emulsion (approximately up to some 30% of the total mixture). Coloring matter, for example nigrosin, and odorants, for example oil of cloves, are added as required. As emulsifying agent there is employed in a known manner borax, potash, or the like.

Instead of oil of turpentine there can also be employed other volatile oils such as pine needle oil, dwarf pine oil, or lavender oil.

I claim:

1. A permanently plastic cosmetic paint for eyebrows and eyelashes having a base consisting of an emulsion of unsaponified wax with aqueous liquids and containing a rapidly drying oil which is volatile at ordinary temperatures, said volatile oil being present in such an amount as to produce rapid drying of the said emulsion when the latter has been exposed after being applied to the eyebrows and eyelashes.

2. A cosmetic paint for eyebrows and eyelashes consisting of an emulsion of five parts of unsaponified wax with three to ten parts of water, one to sixteen parts of oil of turpentine, a pigment, a perfume and an emulsifier selected from the class consisting of borax and potash for the wax, said oil of turpentine being volatile at ordinary temperatures and serving to rapidly dry the said emulsion when the latter has been exposed after being applied to the eyebrows and eyelashes.

3. A cosmetic paint, as claimed in claim 2, in which said perfume consists of oil of cloves.

HELENE WINTERSTEIN,
NÉE VIERTHALER.